Jan. 11, 1966    W. KOBER    3,229,138
DYNAMOELECTRIC MACHINE
Filed Dec. 4, 1962    5 Sheets-Sheet 1
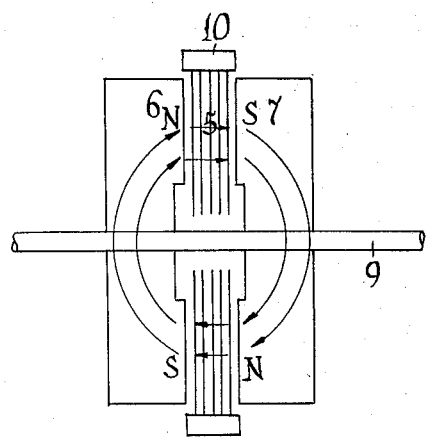
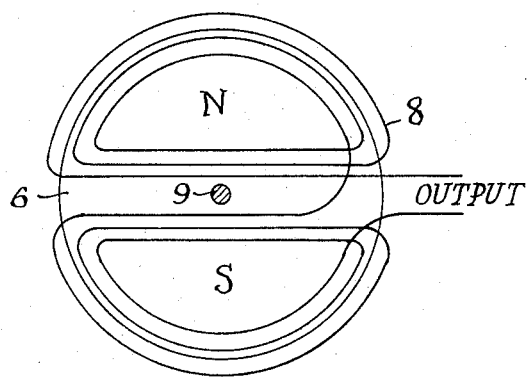
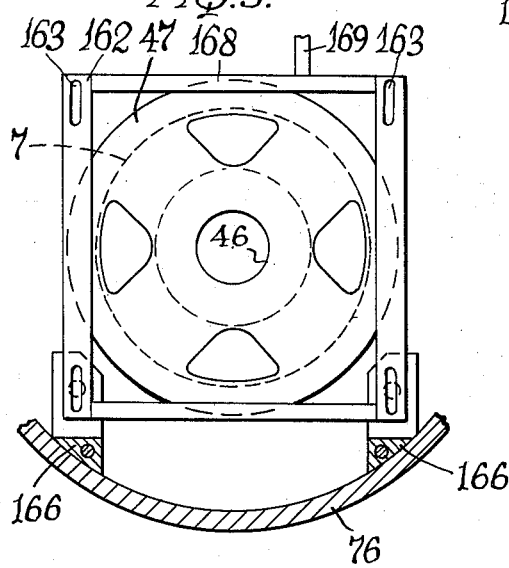
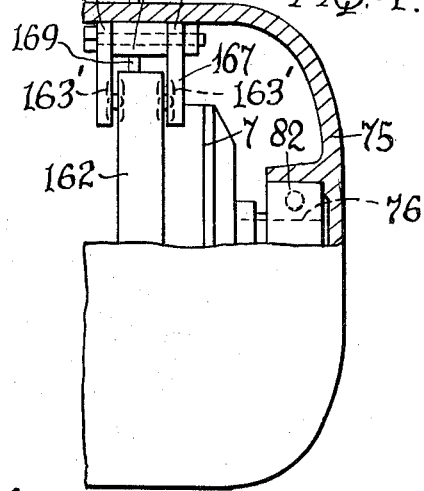
INVENTOR.
William Kober,
BY
Christel and Bean
ATTORNEYS Jan. 11, 1966 W. KOBER 3,229,138
DYNAMOELECTRIC MACHINE Filed Dec. 4, 1962 5 Sheets-Sheet 2

INVENTOR.
William Kober,
BY
ATTORNEYS.

Jan. 11, 1966 W. KOBER 3,229,138
DYNAMOELECTRIC MACHINE
Filed Dec. 4, 1962 5 Sheets-Sheet 3
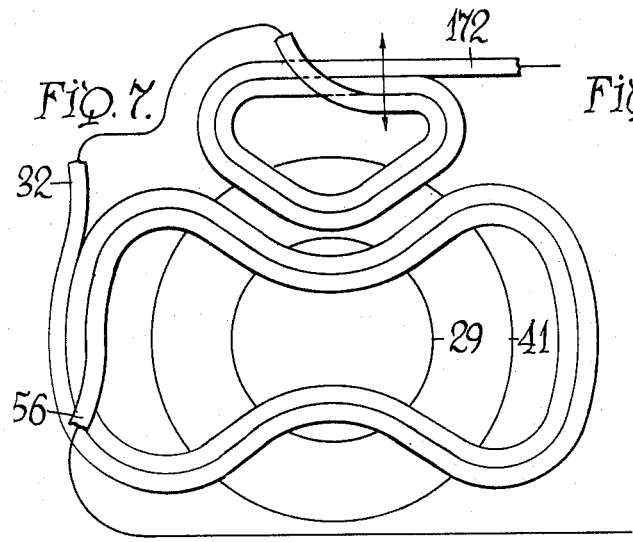
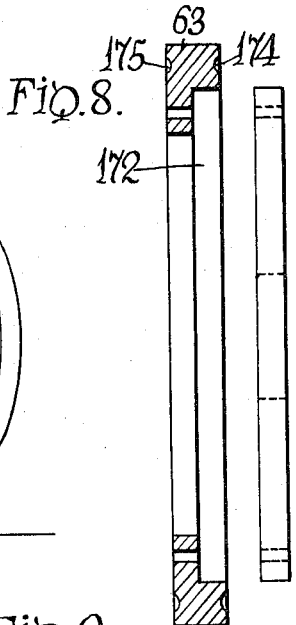
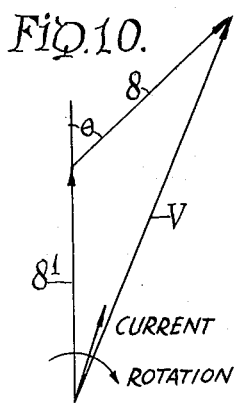
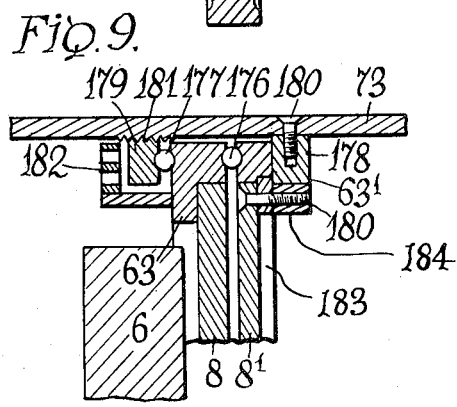
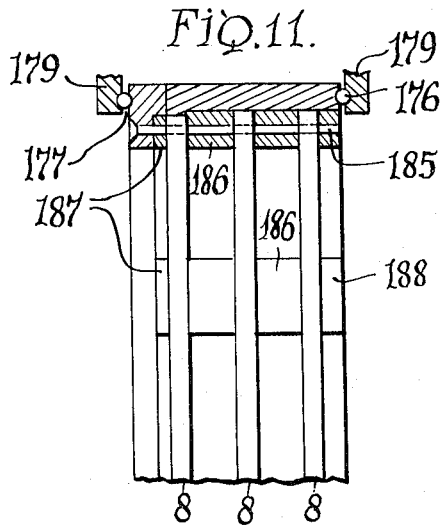
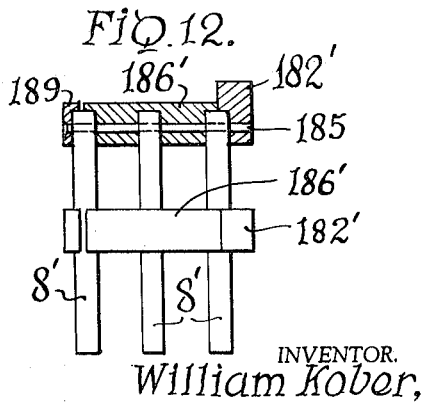
INVENTOR.
William Kober,
BY
Christel and Bean
ATTORNEYS

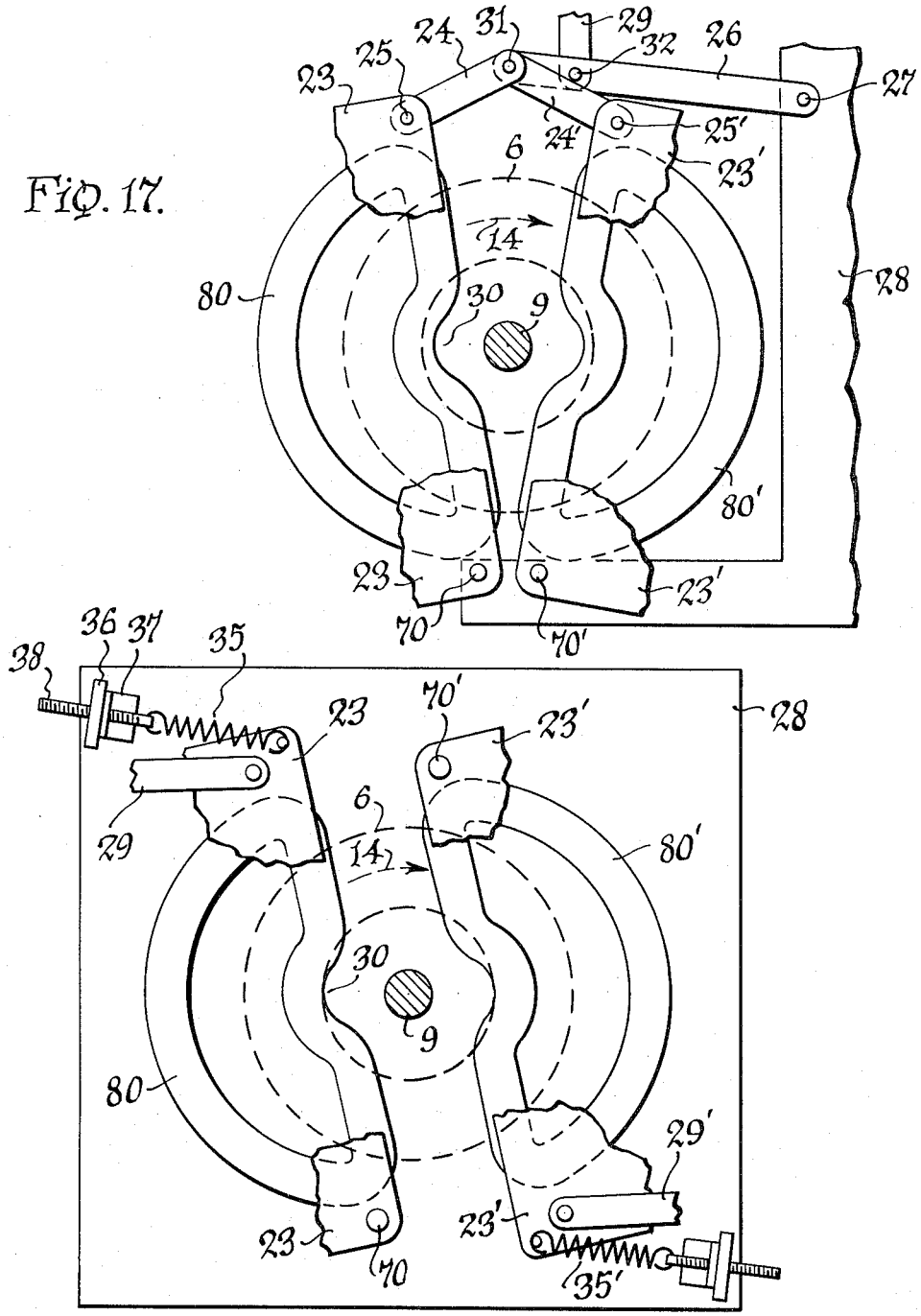

United States Patent Office 3,229,138
Patented Jan. 11, 1966

3,229,138
DYNAMOELECTRIC MACHINE
William Kober, Fairport, N.Y., assignor to
L. R. Power Corp., Rochester, N.Y.
Filed Dec. 4, 1962, Ser. No. 242,259
14 Claims. (Cl. 310—268)

This invention relates generally to the electrical art, and more specifically to a new and useful alternating current generator. This application is a continuation-in-part of my pending application Serial No. 770,029 filed October 28, 1958.

While not limited thereto, this invention is particularly concerned with generators characterized by the provision of opposed field producing structures with an armature winding interposed in the flux path therebetween, it being a primary object of this invention to provide means for controlling and regulating the output characteristics of such a generator, through the armature winding arrangement.

In one aspect thereof, a dynamoelectric machine constructed in accordance with this invention is characterized by the provision of multiple field producing structures mounted for rotation about an axis and spaced apart along that axis to define an axial air gap therebetween, an armature winding positioned in the flux path through said air gap between said field producing structures, and means mounting the armature winding for movement in a manner to produce a desired output characteristic. In another aspect thereof, a dynamoelectric machine constructed in accordance with this invention is characterized by the provision of a field producing structure mounted for rotation about a first axis, an armature winding spaced along that axis from the field producing structure to provide an axial air gap therebetween, and means mounting the armature winding for rotary movement in a plane substantially normal to the first axis about another axis offset from the first axis.

The foregoing and other objects, advantages and characterizing features will become clearly apparent from the ensuing detailed description of certain presently contemplated embodiments of my invention, considered in conjunction with the accompanying drawings which are essentially diagrammatic and schematic in nature, wherein like reference numerals denote like parts throughout the various views and wherein:

FIG. 1 is a longitudinal, sectional view of the basic alternator construction of my invention;

FIG. 2 is an end elevational view of a field producing structure and the armature winding of FIG. 1;

FIG. 3 is a front elevational view of a movable armature of my invention;

FIG. 4 is a fragmentary, longitudinal, quarter-sectional view of an alternator incorporating the armature of arrangement of FIG. 3, on an enlarged scale;

FIG. 7 is a front elevational view of an alternate armature arrangement;

FIG. 8 is an exploded, longitudinal sectional view of the movable armature winding of the embodiment shown in FIG. 9;

FIG. 9 is a fragmentary, longitudinal sectional view of an alternator incorporating the movable armature of FIG. 8 in still another armature arrangement of this invention;

FIG. 10 is a voltage vector diagram, depicting the mode of operation of the embodiment of FIG. 9;

FIGS. 11 and 12 are fragmentary views, partly in longitudinal section and partly in end elevation, of the movable and stationary coil units, respectively, for a three phase generator;

FIG. 17 is an end elevational view, of still another armature construction, parts being broken away for clarity and ease of illustration; and FIG. 18 is a view, like FIG. 17, but showing still another armature control arrangement.

Figure 5:
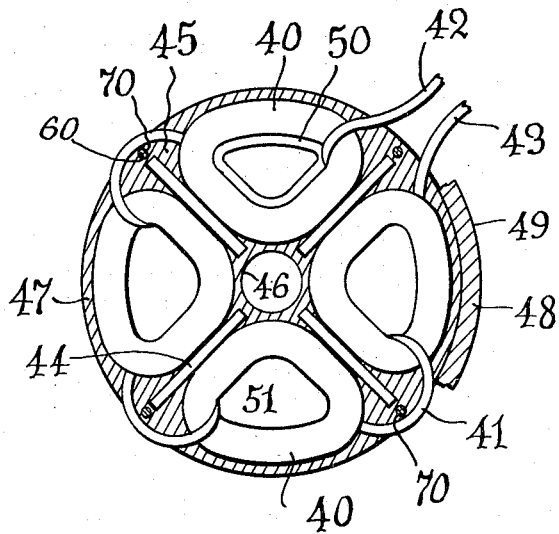
FIG. 5 is a view, partly in section and partly in elevation, of the 4 pole, single phase stator armature winding assembly of FIG. 3, apart from the mounting frame.

FIGS. 1 and 2 show the basic arrangement of this invention. It takes the form of an axial air gap dynamo, but with no stator iron at all. The two field producing structures 6 and 7 face each other across air gap 5 which need only be the relatively short distance required to accommodate stator armature winding 8. Winding 8 obtains no support from stator iron and so requires other methods of support, one supporting structure being indicated by the frame 10'. The winding 8 may or may not contain stator type teeth. The advantages of this basic construction, and details of examples of suitable field producing structures 6 and 7 are fully set forth in my pending application Serial No. 770,029, filed October 28, 1958. This application is concerned with the control and regulation of such a dynamo, through movement of the armature winding. Therefore, a detailed description of suitable field producing structures is thought to be unnecessary herein, and reference is hereby made to my said application Serial No. 770,029 and to my application Serial No. 192,122, for such details.

In permanent magnet field generators, means for varying the voltage, either manually, under control of an external regulator, or automatically as a result of internal forces in the generator, are often required.

This invention includes different methods of varying or regulating the terminal voltage of a permanent magnet field type generator to obtain a desired output characteristic. The methods of this invention also are applicable to electromagnetic field types of generators.

Briefly stated, the methods of this invention involve either moving the winding, or part of the total winding, into and out of the position where maximum flux is linked; and, providing 2 or more winding parts independently movable in phase, and changing the relative phase displacement of the windings.

Voltage control may be applied by moving all or a part of the winding to decrease the effective generated voltage. Since the windings are not attached to any magnetic structure, such as a stator return circuit, it is very easy to move them. The windings are always light, and magnetic forces are normally quite small, outstandingly so when no permeable iron is used for teeth. Thus, in the system of the invention, it is usually convenient to move the windings in this manner. Another factor simplifying movement of the windings as a means of voltage control is the fact that they can be moved directly in relation to the housing, since they are stationary, aside from the adjusting motion.

The voltage generated in any of the windings illustrated in my aforesaid applications can be varied by displacing the center of the winding so that it moves away from coincidence with the center of the shaft. This lateral displacement is then a general means of voltage control, with the voltage dropping as displacement from the symmetrical point increases. Part of this is caused by the inner or outer conductors moving into and out of the boundaries of the field pole area, and part is due to increasing the effective pole pitch of coils moving toward the generator shaft center, and decreasing the effective pole pitch of those moving away.

FIGS. 3 and 4 show one way of mounting a winding to make it give a variable voltage by displacement. The general arrangement of the generator is similar to that shown in FIG. 16 of my pending application Serial No. 192,122. The opposed field structures 6, 7, only one of which is shown, are carried by shaft 76 journaled in bearings 82 mounted in housing 75. The winding 8, of FIG. 3, as shown in detail in FIG. 5, comprises four coils 40 for a four pole single phase stator. An interpole insulating strip 44, of glass-cloth plastic, for example, is positioned between adjacent coils to protect the coil parts against the coil-to-coil voltage which is of course higher than the voltage between adjacent turns in one coil. The coil-spacer assembly is now formed and filled with a suitable plastic or other bondable insulating material into a flat plate, having a hole 46 in the center for shaft clearance and an outer limit 47. The whole may also be made up of a ring of similar insulating material shown at 48, which acts as a wall for the control of material 45 and also has substantial strength. Part 48 is at all points well away from field flux and so may be made of metal. Aside from the projection of the intercoil connections 41 the result is substantially a flat plate with a small hole in the center and an approximately circular outer diameter. Cores with hollow centers, as at 50 or solid as at 51 may be left in the coil centers to increase rigidity.

Figure 6:
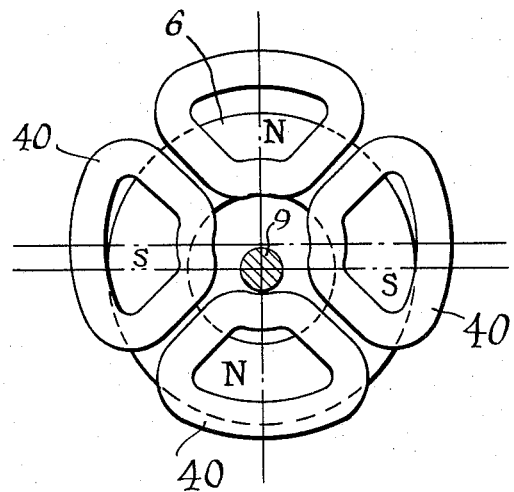
FIG. 6 is an elevational view of an armature, like that of FIGS. 3 and 5, laterally displaced relative to a field producing structure.

Winding 8 is mounted in a rectangular frame comprising side members 162 and top and bottom members 168, with grooves 163 on four areas on each side of the frame. These grooves may be round, and somewhat less than ½ of a round. The rectangular frame may be clamped on winding 8, as by providing paired frame members and a through fastening as shown at 63, 64, 69 and 70 in FIG. 16 of Serial No. 192,122 but with the fastenings not extending to the housing, or otherwise fastened thereto. Paired mountings 164, 165 are bolted to members 166 carried by housing 75, or otherwise fastened to the housing, and mounting parts 164 have grooves 163' opposite to the four grooves 163 on one side of the frame, while mounting parts 165 have similar grooves opposite the four grooves on the other side of frame 162, 168. These paired grooves have linear motion ball bearings and retainers installed therein, as indicated at 167, leaving the frame 162, 168 and winding 8 free to move vertically, as illustrated in FIG. 6, but not free to turn or rotate about the shaft axis. The frame and winding can be moved by motion applied to part 169, which can be done manually or by a motor under control of a regulator responsive to the generator output, or by any other desired means. Part 169 thereby laterally positions the winding in the dynamo.

Thus, it is seen how a stator winding of an axial air gap generator, when moved laterally so that its center and the center of rotation of the field no longer are coincident, produces a change in the effective flux per pole, and so a change in the terminal voltage. FIG. 3 shows a 4-pole axial air gap rotor field and a stator winding with the centers coincident, and FIG. 6 shows the same arrangement with the stator displaced laterally with respect to the rotor. It is obvious that each pole has lost some flux linkage with its winding. In an arrangement of this sort, the coils should be so wound as to be all in series, as the change in effective voltage is different for some poles than for others. The wave form of the voltage produced is changed somewhat by such a shift, but since the effect is to produce a greater distribution of the winding with respect to the field poles, this result is generally to improve the approximation to sinusoidal voltage in the displaced position.

It will be appreciated that the displacement shown is effective to vary voltage with any number of poles in the generator. When the poles are few, the movement required to produce a given voltage change is greater than when the poles are many. Also, the relation of the line of displacement to the orientation of the stator windings is not particularly important. In FIG. 6, the displacement is along an inter-pole line, but this is shown merely as an example. It will be seen on inspection that a movement of somewhat more than one-half of the chordal pole pitch will reduce the voltage to zero. For the purpose of regulating to constant voltage with a moderate change in rotor speed and the full range of load variation, only a fraction of this range of motion and control is required.

When the stator and rotor are coaxial, as in FIG. 3, there is no force tending to move the stator laterally. However, as some displacement is made, there is a force roughly proportional to the electrical load on the generator tending to increase the displacement. This is in accord with the general principle that a system will shift to reduce work being done to a lowest level. The forces involved are not very great, but are of interest, particularly in view of the invention.

It is possible to vary the voltage by using a separate mounting for each coil. In FIG. 5, if the joining devices of the four coils 40 are removed, each coil may be moved separately outward from the center on a parallel motion mount or frame similar to that of FIG. 3. One or more coils may be moved separately or together, and as each coil moves outward, the voltage generated in it will be reduced. Connectors 41 must of course be made flexible to accommodate the relative motion. If only one coil is moved, in a four pole winding, a 25% variation in voltage is possible, which is usually about the range required. Two coils out of four will give a 50% range.

If the coil system of FIG. 5 is split along a diameter, between coils, two pairs of coils are formed. The lower pair may be fixed, and the upper pair moved by a parallel motion similar to FIG. 3.

The voltage also may be varied by using a regular winding and adding a movable coil element. FIG. 7 shows the plan of this arrangement. Here, in addition to main coil 32, 56, containing open sectors where the field is accessible, and additional coil 172 is found. This coil 172, moved toward and away from the center as indicated by the double arrow, by an arrangement giving parallel motion such as shown in FIG. 3, will generate more or less voltage. Coil 172 is connected in series with main coil 32, 56, as indicated by the dotted lines. A similar coil may be added in the other open sector, or sectors if more than four poles are used.

Another way of varying the voltage is by changing the phase relation between the voltage generated in two different parts of the winding. In this method, a single phase winding is made up of two windings side by side. For this purpose, the general plan of FIG. 16 of my said application Serial No. 192,122 is followed, with modifications to permit close lateral positioning of the moving and stationary windings, and a bearing system to permit ready motion of the moving winding.

In FIGS. 8 and 9 the mounting frame 63 of the moving winding 8 is shown. The winding 8 is the same as in FIG. 5, with mounting holes 70. Frame 63 however is of larger diameter, with a recess 172 for the winding, and adjacent its outer periphery carries arcuate bearing grooves 174, 175 on opposite sides thereof.

The winding is fastened into frame 63 by screws, not shown, which can be recessed into the winding. The stationary winding 8' has a similar annular frame 63', except that the bearing groove 174 is not used.

FIG. 9 shows a fragmentary, longitudinal section through a dynamo housing 73, showing the bearing and mounting arrangement. The parts of FIG. 8 are shown, together with bearing-retainer sets 176, 177 which hold movable ring 63 firm in every direction but rotation. The stationary frame 63' is fastened to part 178, which may be a portion of housing 73 or separate and fastened to the housing by suitable means such as a row of screws 180. Winding 8' is mounted in stationary frame 63', against a retainer ring 183 carried by frame 63', and the frame, retainer and winding are secured to a ring 184, carried by part 178, as by screws 180'. Retainer 183 can be in integral part of frame 63', and ring 184 can be an integral part of 178.

The bearing-retainer set 176 is opposed by frame 63'. The bearing-retainer set 177 is opposed by ring 179 having a bearing groove, as shown, or it can instead have a flat surface. Part 179 is adjusted for proper position to eliminate excessive play in the two bearing groups, by means of threads 181 in housing 73 and in ring 179, or by other suitable means. Now winding 8 is free to rotate about the shaft axis.

FIG. 10 shows how the voltages of windings 8 and 8' combine to give the terminal voltage V. When the relative phase displacement angle $\theta$ is small, V is insensitive to angular displacement. When $\theta$ is larger, a more rapid response of voltage to angle results. Thus, the moving coil is usually operated over a range with $\theta$ well away from a zero value. There is no point in using negative values of $\theta$, as the voltage follows the same rule for negative angles.

In a polyphase system, the relation of each pair of windings making up a phase should change the same amount. In FIG. 11, the three moving coil sets 8 are all connected together by parts 186, which bridge across the coil sets and are secured thereto and to ring 63 by threaded bolts 185. End pieces 187 and 188 can be positioned at opposite ends of the coil sets. Parts 186 are not continuous, around the winding, but consist of a series of circumferentially spaced arms. This allows the three stationary coil sets 8' (FIG. 12) to be made up in the same way, and interposed between the moving coil sets 8 with the corresponding bridges 186' positioned between bridges 186 of the moving coil sets. The amount of rotary motion permitted windings 8 is that which can take place between contact of the bridges 186 with the bridges 186' on either side. The stationary coils are shown in FIG. 12. Since the stationary windings do not need a bearing race, there is no continuous ring such as 63, and the supports are all bridge type, with ends 189 receiving the heads of bolts 185, and with the ends 182' fastening to the housing 73 in the same manner as 178 in FIG. 9. Ring 63 now requires two bearing races like 179 of FIG. 9, one on each side, and ends 182' will be positioned or arranged to accommodate the adjacent race 179.

The movable stator ring may be adjusted manually, or by a motor under control of the generator output, or by other means.

Also, the load current flowing in each stator causes a resultant force tending to move the stator in the direction of rotation of the generator. If the moving stator is rotated out of phase relative to the other, to a minimum generated voltage point against the direction of rotation of the shaft, the internal torque force on it from electrical loading will tend to move it to increase the generated voltage. If a spring is opposed to this motion, the moving stator will take a position depending on the load current and the spring characteristic, whereby more voltage is generated. A properly chosen spring will permit substantially full compensation for load voltage drops in the generator at any given power factor, or if desired, under or over compensation. The spring may be of a spiral type, shown at 182 in FIG. 9, with one end fixed relative to housing 73, and the other end connected to moving coil frame 63. The torque on the stator is proportional to the product of current times moving stator generated voltage, times cosine of the angle between these vectors, all on a scale depending on other design factors of the generator. Thus, the torque will usually increase for a given electrical load as $\theta$ gets smaller. The torque also depends to some extent on the power factor of the load. Spring 182 is preferably non-linear, and may consist of two or more springs.

For stators with the windings mounted in permeable teeth or other frames, similar arrangements are possible with minor changes in the above described structures.

It is a purpose of the invention to secure voltage control with a simpler mechanical movement, and simultaneously, to produce a system in which the normal internal magnetic forces will be such as to produce a movement tending to increase the voltage, and the work done, as the load increases. This can produce a system, in which, by use of a properly chosen spring, the generated voltage will increase as load increases, and produce the result usually desired, a substantially constant output voltage over the load range.

Figure 13:
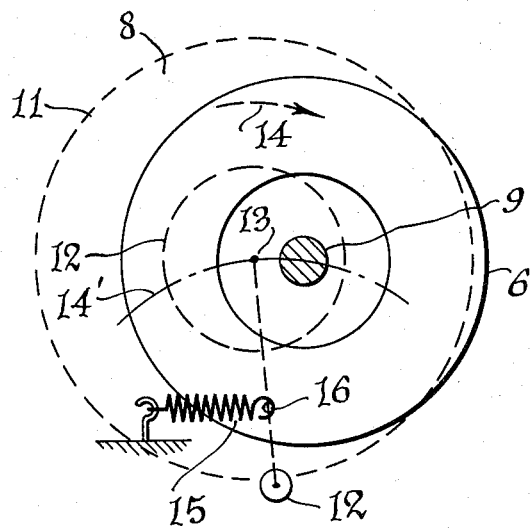
FIG. 13 is a diagrammatic view depicting the operation of the armature arrangement of FIG. 14.
Figure 14:
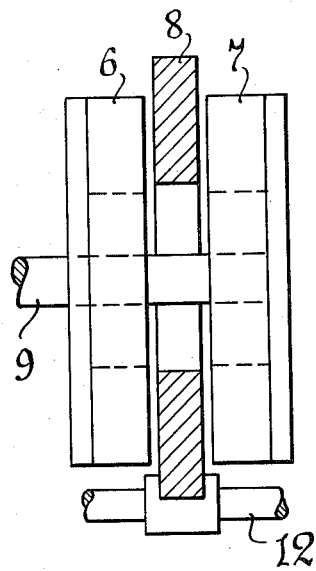
FIG. 14 is a fragmentary view, partly in elevation and partly in longitudinal section, of still another armature arrangement of my invention.

In FIG. 13, the rotor is shown at 6, similar to its presentation in FIG. 2, but the stator is shown only as a composite ring 8, in dotted lines, having an outer diameter 11 and an inner diameter 12. The stator 8 is supported by a shaft 12, suitably journaled in one or more bearings not shown, so that its center 13 can swing in arc 14, but always remain in position axially between the two rotor halves 6, 7. Arc 14, preferably passes through the center of the rotor shaft 9, to make possible a position of the stator with its center coincident with the rotor center, the position of maximum flux linkage and voltage. It will be seen that the motion along arc 14 differs in no important way from the straight line displacement of FIG. 6, and is essentially as effective in terms of total displacement of the stator center 13.

The shaft and bearing mounting is, however, much simpler mechanically than any parallel motion movement of sufficient rigidity to perform this desired function.

A great new advantage also appears. An electrically loaded stator must have a torque applied to it by the interaction of the load current and the field magnetic flux. By conservation of energy, this torque is substantially proportional to the electrical power developed. The stator 8 thus has a torque applied to it, and, since torque is the same at any point of a rigid body, this torque also appears in equal amount at shaft 12. If the rotor 6 is turning clockwise, as indicated by arrow 14 in FIG. 13, the stator 8 will thus, when electrically loaded, have a clockwise torque produced on it. This motion, about pivot 12 will tend to move stator 8 toward the right in FIG. 13, or toward coincidence of stator and rotor centers. This produces more generated voltage, which can be made to correct or, if desired, undercorrect or overcorrect for the natural drop in voltage of the generator with load. The spring 15, shown schematically in FIG. 13, by opposing this motion with a force varying with displacement to balance the torque described, is the simplest means to control the desired motion resulting from the torque. As mentioned above, there is some tendency for electrical load to produce a force tending to repel stator 8 laterally, but the torque force is normally much greater. It is sometimes desired to obtain the opposite type of voltage change, and aggravate the drop of voltage with load. This may be done in FIG. 13 by reversing the direction of rotation 14, and moving spring 15 to the other side. The load torque then tends to move the stator away from coincidence, and the voltage drops as rapidly as desired as load increases.

The spring 15 may be of a non-linear characteristic, or attached to stator 8 at point 16 at a desired angle to line of centers 13, 14 to produce a force that varies non-linearly with the angular displacement of the stator.

Figure 15:
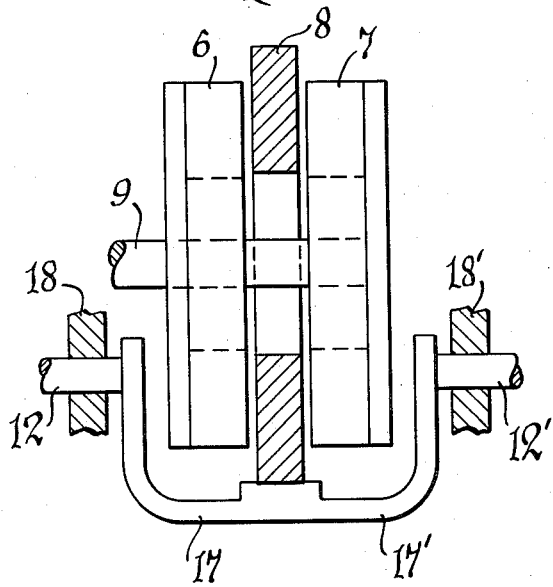
FIG. 15 is a view similar to FIG. 13, but depicting a different pivot arrangement.

Pivot 12 is for convenience shown beyond the outside of the rotors 6, 7. However, if desired the pivot can be placed nearer the rotor shaft by a support 17, 17' attached to the stator and which bridges the rotors and permits pivots 12, 12' to be placed on relatively fixed supports 18, 18' (which can be housing end bells) at any desired distance from rotor shaft 9, as shown in FIG. 15. The bridge need not be developed on both sides of the rotor 6, 7, but may be on the side designated by numerals 12', 17', 18', or only on the other side, if the bearing is suitably free from play.

Figure 16:
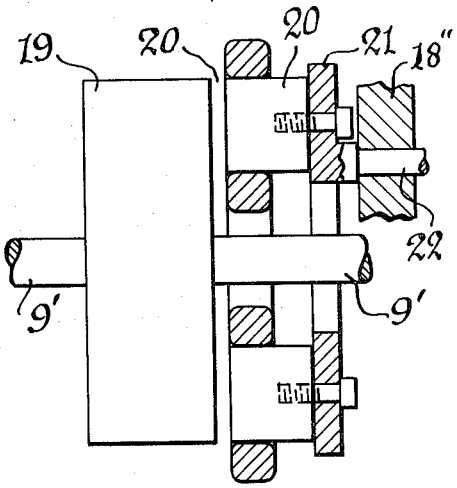
FIG. 16 is a fragmentary view, partly in elevation and partly in longitudinal section, of another alternator construction, utilizing the armature control arrangement of FIGS. 13, 14 and 15.

FIG. 16 shows the invention applied to a single rotor axial air gap generator, in which the stator as well as the rotor contains a flux return path. Such constructions are shown, for example, in my Patents 2,719,931, 2,784,332 and 2,824,275. The rotor field 19 is mounted on shaft 9'. The stator 20, instead of being mounted to a firm support, or being movable in a direction to change the length air gap 24 to control the generated voltage is mounted on plate 21, to which is attached a pivot shaft 22 displaced from the rotor shaft 9'. The bearing (not shown) journaling shaft 21 on relatively fixed support 18", should be substantial and free from end play and wobble, as there is usually a considerable magnetic force between rotor 19 and stator 20. Shaft 22 then supplies a pivot functioning as pivot 12 of FIG. 13, and to be controlled in the same way. Thus, this type of axial air gap generator, as well, is controllable by the natural forces of electrical load to modify the output voltage as desired by arcuate displacement of the center of stator 20 with respect to the center of rotor 19.

One disadvantage of the structures shown so far is that the amount of displacement of the stator armature is limited by the movement permitted between the inside opening of the stator, as circle 12 in FIG. 13, and the shaft 9. In machines with many poles, six or more, there is a natural tendency for the opening 12 to be large, and as noted above the movement necessary is simultaneously less. With fewer poles, in particular the minimum number of two, the movement may be too limited for a desired range of voltage. FIG. 17 shows a mounting for a two pole stator that overcomes this difficulty. The coils 80 and 80' are each held in a separate frame, shown fragmentarily at 23 and 23' in the same manner as units 200 and 201 in FIGS. 39 and 40 of Serial No. 192,122 except that separation is maintained. Note the bend 30 in the coils to avoid contact with the rotor shaft 9 when the coils are together and touching the vertical center line. Coil 80 is pivoted at 70, and coil 80' at 70', the pivot bearing providing a minimum of end play and wobble. On the other end of the coil pins 25 and 25' and links 24 and 24' are provided. These two links are joined at pin 31. Link 26, pivoted at one end to links 24 and 24' at 31, is pivoted at the other end in the frame 28 to which the rotor bearings (not shown) are also mounted, and on which pivots 70 and 70' are mounted. Link 26 is moved by link 29, pivoted thereto at 32, and provides a motion of pin 31 substantially along the vertical center line, and insures approximately equal motion of coils 80 and 80', on either side of the center line.

This structure is intended for control from an outside force, such as a manual control, or an electrodynamometer, actuator, or other control device connected to a voltage regulator, not shown. There is not much force reacting back on control link 29, since the torques produced at 70 and 70' are now balanced. This arrangement gives the convenience of the pivots 70, 70' as a mounting, allows any desired amount of separation of the stators winding parts 80, 80', neutralizes the load reaction torque when this is not desired.

This arrangement, shown for two poles, is also useable for any pole number, with the stator separated into halves and mounted to an appropriate frame.

FIG. 18 shows an arrangement having some of the advantages of the construction of FIG. 17, and also making possible voltage control using forces developed in the machine in normal operation. The advantages conserved are a large range of control with any desired separation of the stators 80 and 80' being possible, and the convenience of the pivot mounting to produce coil motion. The operation of the stator half 80 in response to torque resulting naturally from load current is similar to that described for FIG. 13. The rotor 6 turns clockwise, and spring 35 opposes and thereby controls this motion. The spring is fastened to the frame 23 of coil 80 at one end, and at its other end to an adjustable point, on screw 38, under control of nut 36 against bracket 37 mounted on frame 28. As shown, this motion produces increasing generated voltage with increasing load, since the flux included in coil 80 increases as it approaches the vertical center line. This is the type of voltage control usually desired, to counteract the normal drop of terminal voltage with load. However, the spring and motion can be reversed, as with the machine of FIG. 13, if the opposite voltage control is required. Non-linear springs will also be preferred in some cases.

The other half of the stator, coil 80', operates in the same way, its torque induced motion being opposed by springs 35' connected either to an adjustable part, like 38, or fixed to frame 28. As shown, the motion of 80' is independent of that of 80, but, of course, since all things are substantially equal in the two halves, the two coils will normally move in a symmetrical manner. Note that the torque and motion of 80' give exactly the same result as for 80. If desired, pivots 70 and 70' can be connected to turn identically by using cranks on 70 and 70' and a joining link, not shown, or by a belt or cable, chain or other similar device, not shown. It will also sometimes be unnecessary to move both stator parts 80 and 80' for the desired range of voltage control. In this case, say 80' can be immovably fastened in maximum voltage position, and 80 be left as in FIG. 6. It may also be desirable to have 80 movable in normal manner, as shown in FIG. 18, and have 80' manually adjustable.

In FIG. 18 and in FIG. 13, it is in some cases desired to use the self-regulating system using load torque in connection with a simultaneous additional force from an electrodynamometer or actuator, the latter under control of a regulating system sensing terminal voltage, current, frequency or some combination of these as put out by the generator. The stroke output of the actuator or similar device may be applied to frame 23' by link 29', or frame 23 by link 29. Either or both coils 80 and 80' may be moved by the actuators and the springs and load torque simultaneously, or in any combination, though for purposes of simplicity, usually only one actuator is used per machine.

The coil parts 80 and 80' have been shown equal, as in a 2-pole generator. However, in a generator with four poles, part 80 could consist of one pole, and part 80' of three poles. In this case, the shaft would not interfere with the larger part 80' as may be seen from FIG. 6. Similar arrangements are available with generators having more than four poles.

Having fully disclosed and completely described my invention, and its mode of operation, what I claim as new is:

1. An alternating current generator comprising multiple field producing structures each having north and south poles with the north and south poles of one structure positioned proximate the south and north poles, respectively, of the other structure, means mounting said structures for rotation about an axis, and an armature winding having portions positioned in the flux path between said proximate poles, whereby transmission of alternating flux occurs only across the relatively short air gap between said proximate poles, together with means mounting said winding for movement relative to said structures thereby to produce a desired output characteristic.

2. An alternating current generator comprising multiple field producing structures each having north and south poles with the north and south poles of one structure positioned proximate the south and north poles, respectively, of the other structure, means mounting said structures for rotation about an axis, and an armature winding having portions positioned in the flux path between said proximate poles, whereby transmission of alternating flux occurs only across the relatively short air gap between said proximate poles, wherein said winding comprises parts movable one relative to another thereby to produce a desired output characteristic.

3. An alternating current generator comprising multiple field producing structures each having north and south poles with the north and south poles of one structure positioned proximate the south and north poles, respectively, of the other structure, means mounting said structures for rotation about an axis, and an armature winding having portions positioned in the flux path between said proximate poles, whereby transmission of alternating flux occurs only across the relatively short air gap between said proximate poles, wherein said winding comprises parts one of which is movable relative another thereof and to said structures thereby to produce a desired output characteristic.

4. A dynamoelectric machine comprising multiple field producing structures each having north and south poles with the north and south poles of one structure positioned proximate the south and north poles, respectively, of another structure, means mounting said structures for rotation about an axis, an armature winding positioned in the flux path between said proximate poles, and means mounting said winding for movement relative to said structures thereby to produce a desired output characteristic.

5. A dynamoelectric machine as set forth in claim 4, wherein said winding is mounted for linear movement in a plane substantially normal to said axis.

6. A dynamoelectric machine as set forth in claim 4, wherein said winding is mounted for rotary movement about an offset axis parallel to said axis of rotation.

7. A dynamoelectric machine as set forth in claim 4, wherein said winding is mounted for rotation about said axis relative to another armature winding positioned in said flux path between said proximate poles.

8. A dynamoelectric machine as set forth in claim 4, wherein said winding is mounted for movement in response to electrical load produced variations in internal torque thereon.

9. A dynamoelectric machine comprising a field producing structure mounted for rotation about a first axis, an armature winding spaced along said axis from said field structure to provide an axial air gap therebetween, and means mounting said armature winding for rotary movement in a plane substantially normal to said first axis about an axis offset from said first axis.

10. A dynamoelectric machine comprising multiple field-producing structures having opposed proximate poles, means mounting said structures for rotation about a first axis, an armature winding having portions positioned in the flux path between said proximate poles, and means mounting said winding for rotary movement about an axis offset from said first axis in substantially parallel relation thereto.

11. A dynamoelectric machine comprising multiple field-producing structures having opposed proximate poles, means mounting said structures for rotation about an axis, an armature winding having portions positioned in the flux path between said proximate poles, and means mounting the entire armature winding for linear movement as a unit in a plane normal to said axis.

12. A dynamoelectric machine comprising multiple field-producing structures having opposed proximate poles, means mounting said structures for rotation about an axis, armature windings having portions positioned in the flux path between said proximate poles, and means mounting one of said windings for rotation about said axis relative to another thereof thereby to produce a desired output characteristic.

13. A dynamoelectric machine comprising multiple field-producing structures having opposed proximate poles, means mounting said structures for rotation about an axis, an armature winding having portions positioned in the flux path between said proximate poles, and means mounting said winding for movement relative to said structures in response to electrical load produced variations in internal torque on said winding.

14. A dynamoelectric machine comprising a field-producing structure mounted for rotation about an axis, an armature having at least two coils spaced along said axis from said structure to provide an axial air gap therebetween, and means mounting said armature coils for simultaneous opening and closing movement toward and away from said axis.

References Cited by the Examiner
UNITED STATES PATENTS

| | | | |
|---|---|---|---|
| 514,907 | 2/1894 | Bush | 310—268 |
| 2,479,589 | 8/1949 | Parker | 310—268 |
| 2,573,283 | 10/1951 | Seilz | 310—268 |
| 2,736,831 | 2/1956 | Adam | 310—268 |
| 2,824,275 | 2/1958 | Kober | 310—268 |
| 2,847,589 | 8/1958 | Haydon | 310—268 |

JOHN F. COUCH, *Primary Examiner.*